United States Patent [19]
Osborn

[11] Patent Number: 5,954,179
[45] Date of Patent: Sep. 21, 1999

[54] TRANSMISSION-MOUNTED PARK-POSITION INTERLOCK SYSTEM

[75] Inventor: Charles Osborn, Spring Lake, Mich.

[73] Assignee: Grand Haven Stamped Products Division of JSJ Corp., Grand Haven, Mich.

[21] Appl. No.: 09/065,320

[22] Filed: Apr. 23, 1998

Related U.S. Application Data

[60] Provisional application No. 60/047,018, Jun. 14, 1997.

[51] Int. Cl.[6] ................................................. B60K 41/26
[52] U.S. Cl. ..................................... 192/219.5; 192/220.7
[58] Field of Search ............................... 192/220.7, 219.5, 192/220.2, 220.3, 220.4, 220.5, 220.6; 477/96

[56] References Cited

U.S. PATENT DOCUMENTS

| | | | |
|---|---|---|---|
| 2,966,244 | 12/1960 | Schreyer | 188/31 X |
| 4,069,900 | 1/1978 | Stamate | 192/220.1 |
| 4,549,448 | 10/1985 | Kittle | 192/220.4 X |
| 5,009,295 | 4/1991 | Kinkade et al. | 192/220.2 |
| 5,167,308 | 12/1992 | Osborn | . |
| 5,275,065 | 1/1994 | Ruiter | . |
| 5,402,870 | 4/1995 | Osborn | 192/220.7 |
| 5,494,141 | 2/1996 | Osborn et al. | . |
| 5,677,658 | 10/1997 | Osborn et al. | . |

*Primary Examiner*—Rodney H. Bonck
*Attorney, Agent, or Firm*—Price, Heneveld, Cooper, DeWitt & Litton

[57] ABSTRACT

The present apparatus includes a park/lock mechanism mounted on a transmission for controlling operation of the transmission and, more particularly, for preventing the transmission from being shifted out of the park position until predetermined vehicle operating conditions are met. The park/lock mechanism is remotely actuated by an actuator physically connected to the park/lock mechanism and electrically connected to the shift lever. The park/lock mechanism includes a linkage having a pair of links connected in an overcenter arrangement, the toggle links providing a mechanical advantage and moving overcenter as the park/lock mechanism moves to a park/lock position. A hydraulic circuit and electrical circuit for operating the actuator is also disclosed.

22 Claims, 6 Drawing Sheets

TRANSMISSION-MOUNTED PARK-POSITION INTERLOCK SYSTEM

CROSS-REFERENCE TO RELATED APPLICATION

This application claims benefit under 35 U.S.C. §119(e) of the filing date of U.S. Provisional Application No. 60/047,018, filed on May 14, 1997, the entire disclosure of which is incorporated by reference herein.

BACKGROUND OF THE INVENTION

The present invention concerns a remotely actuated park/lock mechanism configured to prevent accidentally shifting a transmission out of the park position.

With recent advances in electronics and the subsequent integration of electronics into vehicle systems, many functions historically performed mechanically are now candidates for conversion to electronic devices or electromechanical devices. Such functions relate to engine and transmission control (more broadly called "power plant management"), antilock braking, steering, passenger compartment climate control, and the like. In regard to the present device, some vehicle manufacturers are considering using electronic controls to control transmission shifting, and are considering mechanically decoupling the transmission shifter completely from the vehicle transmission. Proponents of an "all electrical" shift system argue that it has advantages in terms of lower part and assembly cost, simplified routing of parts from the shifter to the transmission, reduced warranty, and improved customer satisfaction, including possible customization of the vehicle shift pattern and feel for specific customer preferences. However, sometimes manufacturers still want a direct mechanical link of some kind. A reason is because a shifter that is not mechanically coupled in some way to a transmission has a disadvantage in that mechanical couplings physically prevent accidental shifting. Additionally, new systems always introduce new problems. For example, an "all electronic" system must be designed to safely deal with a dead battery, low electrical voltage/low power in the vehicle, unexpected total loss of electrical power (while parked or while driving), towing situations, and countless other scenarios. One problem in particular occurs in electrically controlled automatic transmissions with torque converters, because the automatic transmission characteristically is rotatable when the transmission is in a drive gear (e.g., drive or reverse) and the engine is off. Therefore, these transmissions must have a mechanical or electromechanical park/lock device that fixes the transmission gears against rotation to prevent a parked vehicle from simply rolling away, even if vehicle electrical power is lost. Another concern is that federal regulations require that certain predetermined vehicle conditions be met before a shifter can be shifted out of the park position. Many manufacturers satisfy these federal regulations through use of a brake-ignition-transmission-shift-interlock (BITSI) device, which physically holds a shift lever in the park position until the predetermined vehicle conditions are met. However, a BITSI system must be able to perform its function satisfactorily and positively, including vehicle "power on" and "power off" ignition conditions, as well as if the vehicle power source goes dead.

One advantage that the proponents of an "all electrical" shifting system point to is elimination of a Bowden transmission shift cable or mechanical linkage. Many modern passenger vehicles have transmission shifters with a pivotable shift lever mechanically connected to a vehicle transmission, such as by a Bowden cable or mechanical linkage. Recently, many vehicle manufacturers have incorporated park/lock mechanisms into the shifters for automatic transmissions to prevent movement of the shift lever out of the park position unless certain predetermined vehicle conditions are met. However, it is difficult to control quality and functionality of a shifter-mounted park/lock mechanism in an assembled vehicle since the shifter manufacturer, the Bowden cable manufacturer, the transmission manufacturer, and the vehicle assembler are all typically different companies.

I have conceived of integrating a park/lock mechanism with a remotely operated actuator directly into the vehicle transmission, which provides many of the advantages of the existing mechanical and electromechanical park/lock systems, but without the problems associated with Bowden cables. This allows the transmission manufacturer to substantially control the entire system in terms of functionality and quality. Advantageously, my invention integrates the park/lock mechanism directly into the vehicle transmission and links it directly to the transmission component that prevents accidental rotation of the transmission gearing, so that several parts are eliminated. Still further, the overall assembly is improved such as by elimination of the assembly steps of installation and hookup of Bowden cable or other mechanically operated transmission linkage. Even more broadly, I have conceived of a hydraulically activated and/or electrically controlled park/lock mechanism where the electrical connection between a shifter and its transmission have totally eliminated the need for a mechanical connection between the shifter and the transmission.

Accordingly, an apparatus solving the aforementioned problems is desired.

SUMMARY OF THE INVENTION

The present invention includes an apparatus comprising a transmission having gearing and an antirotation device engageable to stop the gearing from rotating, and an interlock member in the transmission for engaging the antirotation device. The interlock member is movable between a park position for engaging the activation device to hold the gearing against rotation and a release position allowing the gearing to rotate. The actuator is integrated into or onto the transmission and connected by linkage to the interlock member. An electrical device is operably connected to the actuator for triggering the actuator to move the interlock member to the release position only when predetermined vehicle operating conditions are met. In a preferred form, the linkage provides a mechanical advantage to enter and exit the park position, but also includes a means to prevent binding. Notably, it is contemplated that the actuator can be electrically, hydraulically, pneumatically or mechanically based, or any combination thereof.

In another aspect, the apparatus includes a shifter having a shift lever movable between gear positions including a park position, a pawl for holding the shift lever in the park position, and a sensor for sensing movement of the pawl and/or the shift lever when an operator is ready to shift out of the park position. The apparatus further includes a transmission including a park/lock mechanism for holding the transmission in a non-rotatable inoperative position corresponding to the park position of the shift lever. An actuator is electrically connected to the sensor and physically connected to the park/lock mechanism for operating the park/lock mechanism to move the park/lock mechanism only when predetermined vehicle conditions are met.

These and other features, advantages and objects of the present invention will be further understood and appreciated by those skilled in the art by reference to the following specification, claims and appended drawings.

DESCRIPTION OF THE PRIOR ART

Prior art includes a transmission 10 (FIG. 5) having a notched wheel or drum 11 with notches 12, and a pivoting member 13 with a tooth 14 for engaging the notch 12. The notched wheel 11 is physically connected to the transmission gearing to prevent rotation of the transmission gearing when the transmission is in a "park" position. The tooth 14 engages a particular notch 12 when the transmission is in the park position so the vehicle cannot roll away. A shifter 15 having a park/lock mechanism/cam 15A is operably connected to the pivoting member 13 by a Bowden transmission cable 16 connected with linkage 17. Linkage 17 includes a crank arm 18 fixed to a rotatable axle 19. The axle 19 is rotatably operably connected at one end to transmission casing 11' and has another end with a configured plate 20 thereon. Configured plate 20 engages a push pin 21 to pivot pivoting member 13 in its holder 22. Configured plate 20 also includes a surface with depressions 23 thereon that correspond to transmission gear positions park P, reverse R, neutral N, and drive D, which depressions are engaged by a spring biased roller 24. A side surface 20' includes multiple arcuate electrical contacts 20" that also correspond to the transmission gear positions P, R, N, and D. The arrangement of roller 24 and depressions 23 helps hold the configured plate 20 accurately in one of the P, R, N, and D gear positions, and a sensor engages contact 20" to cause the vehicle system to hold the transmission in a selected gear position.

Figure 5:
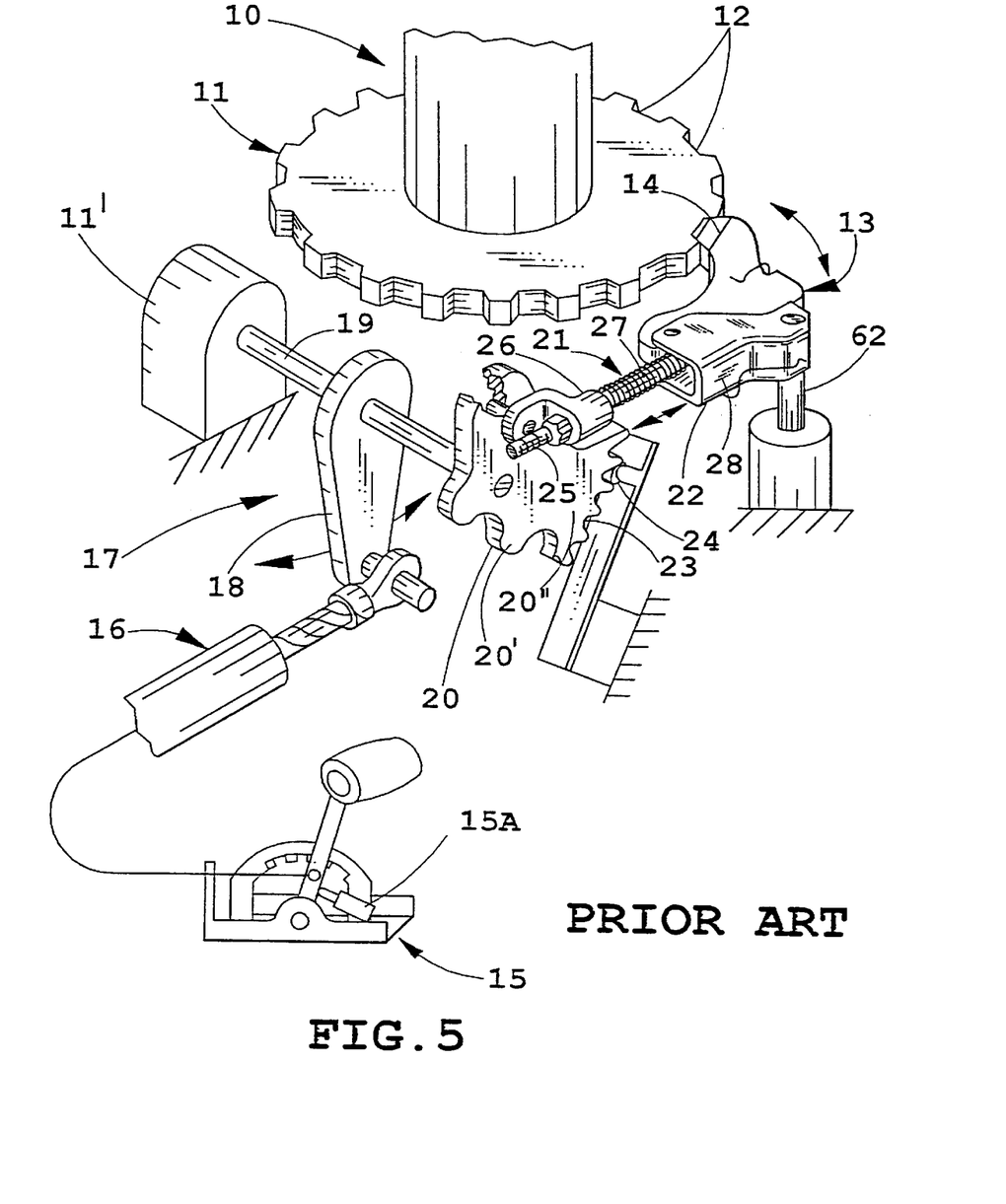
FIG. 5 is a perspective view of a prior art transmission-mounted mechanism.

Notably, the push pin 21 includes a rod 25, a slider 26 operably mounted on the rod 25, and a coil spring 27 for biasing slider 26 to an extended position on the rod 25. The spring 27 is compressible and allows the slider 26 to move along the rod 25 and compresses the spring 27, such as when the pivoting member 13 is misaligned with the notches 12 and cannot yet be pivoted to the park position. A second spring 28 on the holder 22 biases pivoting member 13 to a normally disengaged position, so that the pivoting member disengages when push pin 21 is pulled by operation of linkage 17.

FIGS. 5A–5F show various prior art components that exist on a known transmission. The transmission includes an antirotation device comprising a flywheel or notched wheel or drum 60 having the notches 12 thereon (FIG. 5). The drum 60 is rotatable and rotates with the transmission gearing during operation of the vehicle. The drum 60 is connected to the transmission gearing and is configured to hold the vehicle in a locked park position when the drum 60 is interlockingly engaged by pivoting member 13, so that the vehicle does not unexpectedly move when the shift lever is in the park position. Holder 22 is U-shaped (see FIG. 5), and is fixed to the transmission casing at location 62. A pin extends through holder 22 and defines a pivot 63.

Figures 5A, 5B, 5C, 5D, 5E, 5F:
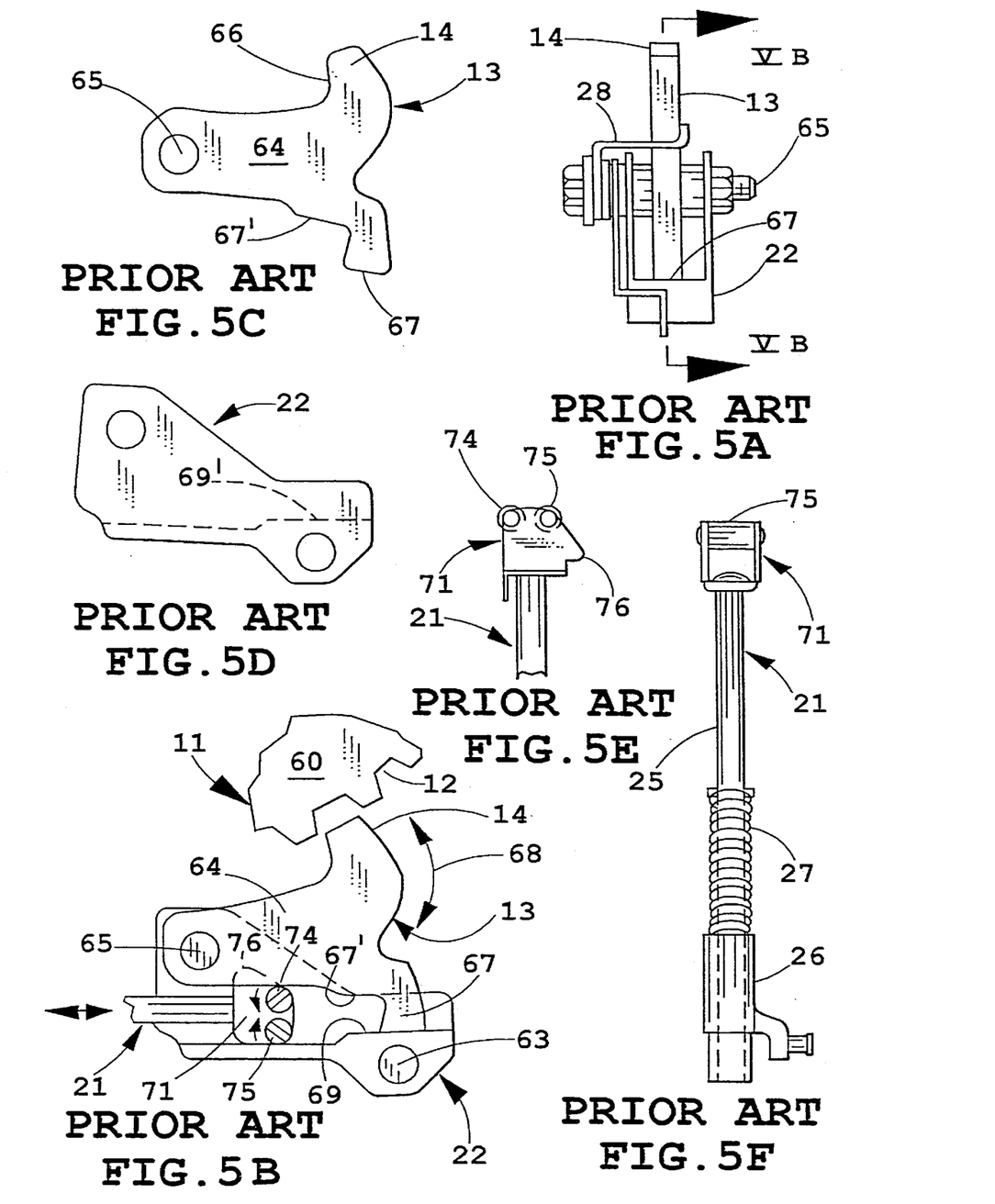
FIGS. 5A–5F are views of particular components and assemblies shown in FIG. 5.

Pivoting member 13 includes a T-shaped body 64 (FIGS. 5B and 5C) having a pivot 65 at one end. The tooth 14 is located at an opposite end. The tooth 14 includes slightly angled abutting edges 66 configured to mateably engage a particular notch 12 (FIG. 5), the slight angle facilitating disengagement and re-engagement, but the angle being substantially perpendicular to prevent accidental disengagement. The end having tooth 14 thereon also includes a stop finger 67 (FIG. 5C) for abutting the inside of the holder 22 (FIG. 5B). The pivoting member 13 is movable along path 68 (FIG. 5B) between a disengaged position (FIG. 5B) and an engaged position (FIG. 5). In the disengaged position, the stop finger 67 engages/bottoms-out in a U-shaped holder 22. The bent wire spring 28 biases pivoting member 13 to a normally disengaged or released position. The space between platforms 67' and a corresponding platform 69' of the U-shaped holder 22 defines a space for the head 71 of the push pin 21 described below. Head 71 includes a pair of rollers 74 and 75 that engage surfaces 67' and 69'. Head 71 further includes opposing fingers 76 that slide along opposing sides of pivoting member 13 and slide within the U-shaped channel in holder 22, such that they act as a guide. As head 71 slides between pivoting member 13 and holder 22 onto platforms 67' and 69', it biases pivoting member 13 into an engaged position (i.e., park position, as shown in FIG. 3) so that tooth 14 engages whatever notch 12 is aligned with the tooth 14.

DETAILED DESCRIPTION OF THE PREFERRED EMBODIMENT

Figure 3:
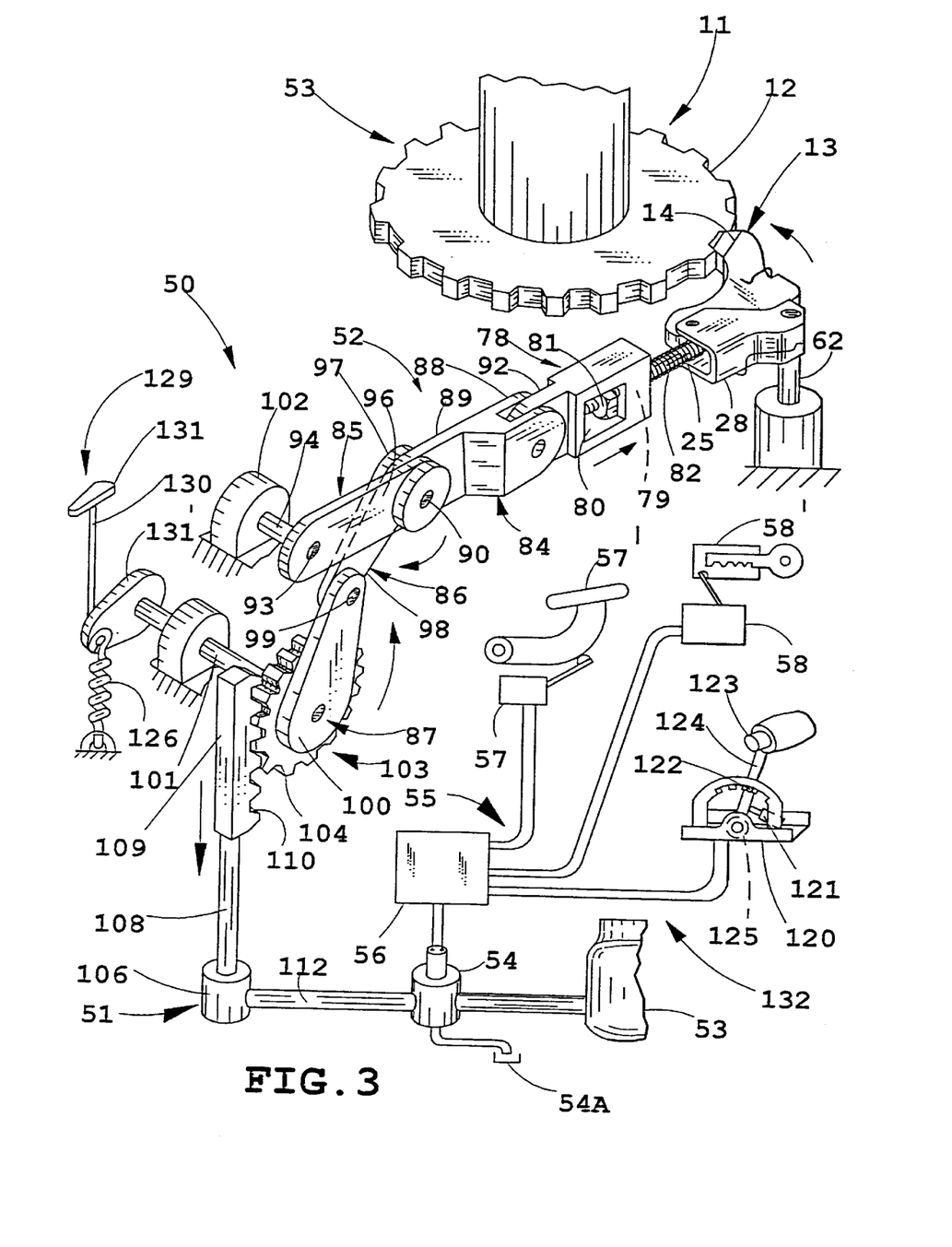
FIG. 3 is an enlarged perspective view of the park/lock mechanism shown in FIG. 2, including related components shown schematically, the park/lock mechanism being in a park position.

For purposes of description herein, the terms "upper," "lower," "right," "left," "rear," "front," "vertical," "horizontal," and derivatives thereof shall relate to the invention generally as oriented in FIG. 3. However, it is to be understood that the invention may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
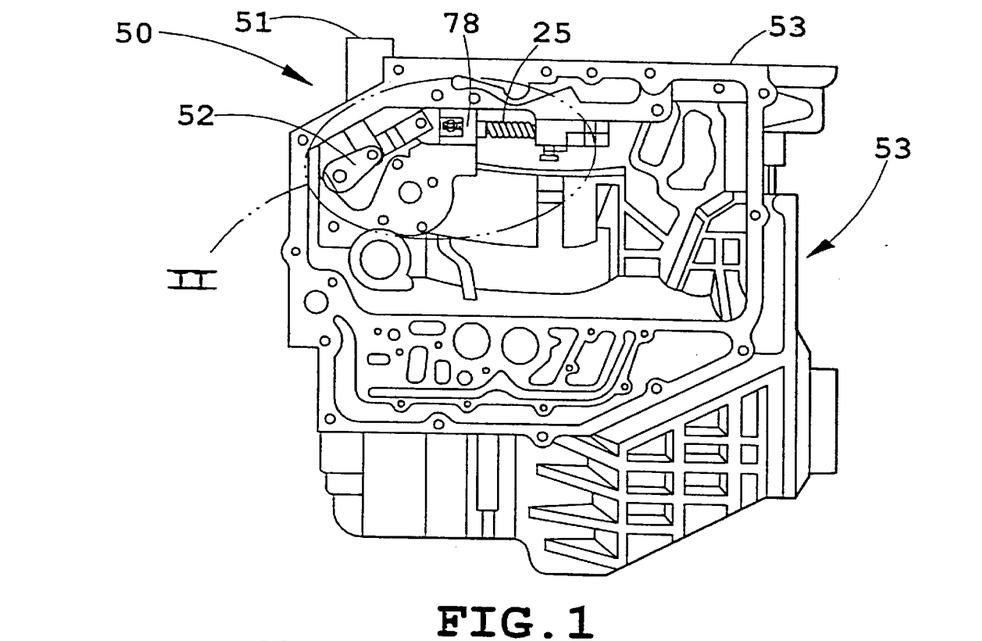
FIG. 1 is a plan view of an inside of a transmission, including the transmission casing, internal components and the park/lock mechanism of the present invention.

An apparatus 50 for providing a park/lock mechanism (FIG. 1) embodying the present invention includes an actuator 51 connected to a pivoting member, such as existing pivoting member 13, by a linkage 52. Actuator 51 (FIG. 3) is hydraulically operated and is configured to operate off of the transmission fluid pressure within transmission 53, with the application of the fluid pressure being controlled by an intermediate solenoid valve 54 electrically connected to a shifter 120. The linkage 52 provides an increasing mechanical advantage as the pivoting member 13 approaches its seated park position. In particular, the linkage 52 includes a T-shaped arrangement of toggle links that press the pivoting member 13 to an engaged hold position in the notches 12 of the notched drum 11, as described below. This arrangement provides for a smooth and sure operation, even with unusually/unexpectedly low fluid pressures within the transmission 53, and further provides added pullout force to exit the park position, such as when the vehicle is on a hill. The arrangement further provides a park interlock function since the valve 54 is operably connected to the vehicle's electrical system 55 which includes an engine/transmission control device 56 (such as an on-board vehicle computer), a brake operated switch 57 operably engaging a brake lever 57', and an ignition "key-on" switch 58 on an ignition switch 58'. It is noted that the arrangement of linkage 52 is not unlike that shown in Application No. 08/713141, filed Sep. 12, 1996, entitled VEHICLE PARK/LOCK MECHANISM WITH CONTROL MODULE HAVING A LOCKING MECHANISM AND A CONTROL SWITCH ACTUATED BY THE LOCKING MECHANISM, the entire contents of which are incorporated herein by reference, and can include identical parts and related components and actuating mechanisms.

In the present park/lock mechanism 50, a modified slide 78 is slidably mounted on rod 25 (FIG. 3). Slide 78 includes a bore 79 for slidably receiving an end of rod 25, and further includes an aperture 80 for receiving a nut 81 that threads onto an end of the rod 25 to hold rod 25 on slide 78. A spring 82 is mounted on rod 25 and is compressed between extruded knobs on the side of rod 25 and the end of slide 78. By this arrangement, the linkage can force slide 78 toward holder 28 without damaging pivoting member 13. In particular, if the tooth 14 of pivoting member 13 is not aligned with a notch 12 in the notched drum 11, the pivoting member 13 cannot move, and accordingly rod 25 also cannot move. Thus, the slide 78 slides on rod 25 compressing the spring 82. At such time as the tooth 14 aligns with notch 12, the spring 82 biases rod 25 to an extended position, causing head 71 to pivot pivoting member 13 into an engaged park position with the notched drum 11.

Linkage 52 further includes an arrangement of toggle links 84–87 (FIG. 3) pivotally interconnected as described below. Toggle link 84 includes a first end 88 pivotably connected to slide 78 and a second end 89 pivotably connected at a main joint 90. End 88 includes a pair of opposing flanges that receive a flange 92 on slide 78 for creating a stable pivot at end 88. Link 85 is pivoted at a first end 93 to a stationary pivot 94 on the transmission casing. Link 85 further includes a second end 96 pivoted at main joint 90. Link 86 includes a first end 97 pivoted at main joint 90 and a second end 98 that extends from first end 97. A driver link 87 includes a pivot 99 pivoted to end 98 of puller link 86. Driver link 87 further includes a second end 100 fixed to rotatable shaft 101. Rotatable shaft 101 can be the shaft 19 (see FIG. 5) or can be a separate rotatable shaft. Shaft 101 (FIG. 3) is rotatably supported at a location on the transmission casing. A pinion gear 103 is secured to rotatable shaft 101 and includes teeth 104. Actuator 51 includes a hydraulic cylinder 106, a piston operably mounted in the cylinder 106, and an extendable rod 108 connected to the piston. The hydraulic cylinder 106 is secured to the transmission casing or can be integrally formed therewith. Extendable rod 108 has a rack 109 attached to its free end and slidably supported for linear movement on the transmission casing. Rack 109 includes teeth 110 configured to operably engage teeth 104 on pinion gear 103.

Figure 2:
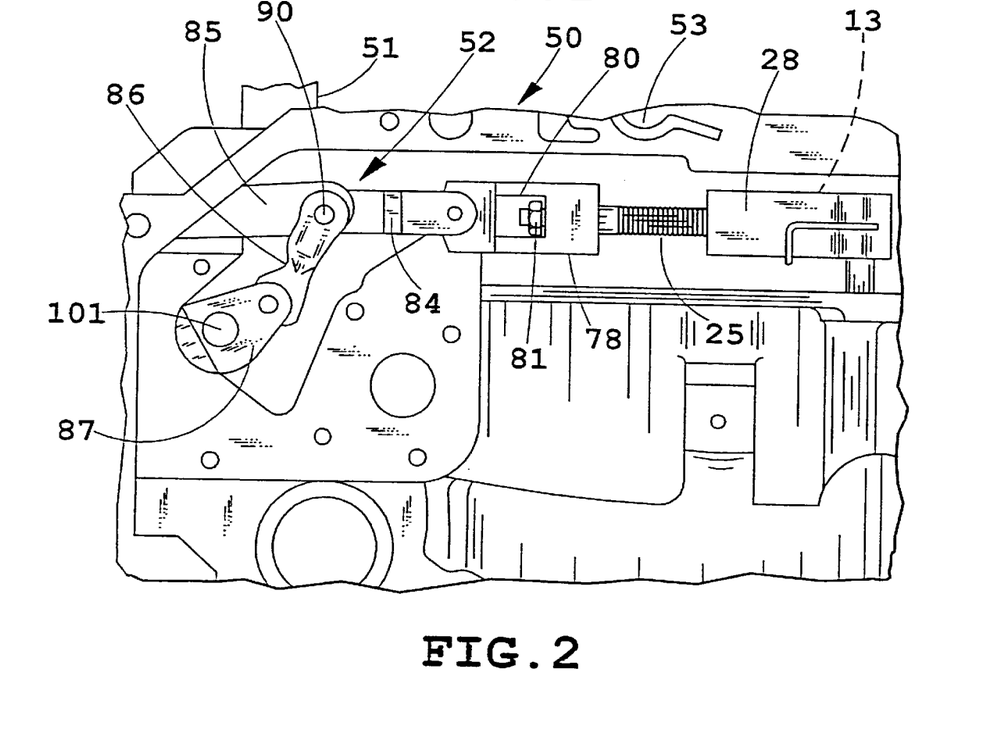
FIG. 2 is a fragmentary enlarged view of the circled area in FIG. 1.
Figure 4:
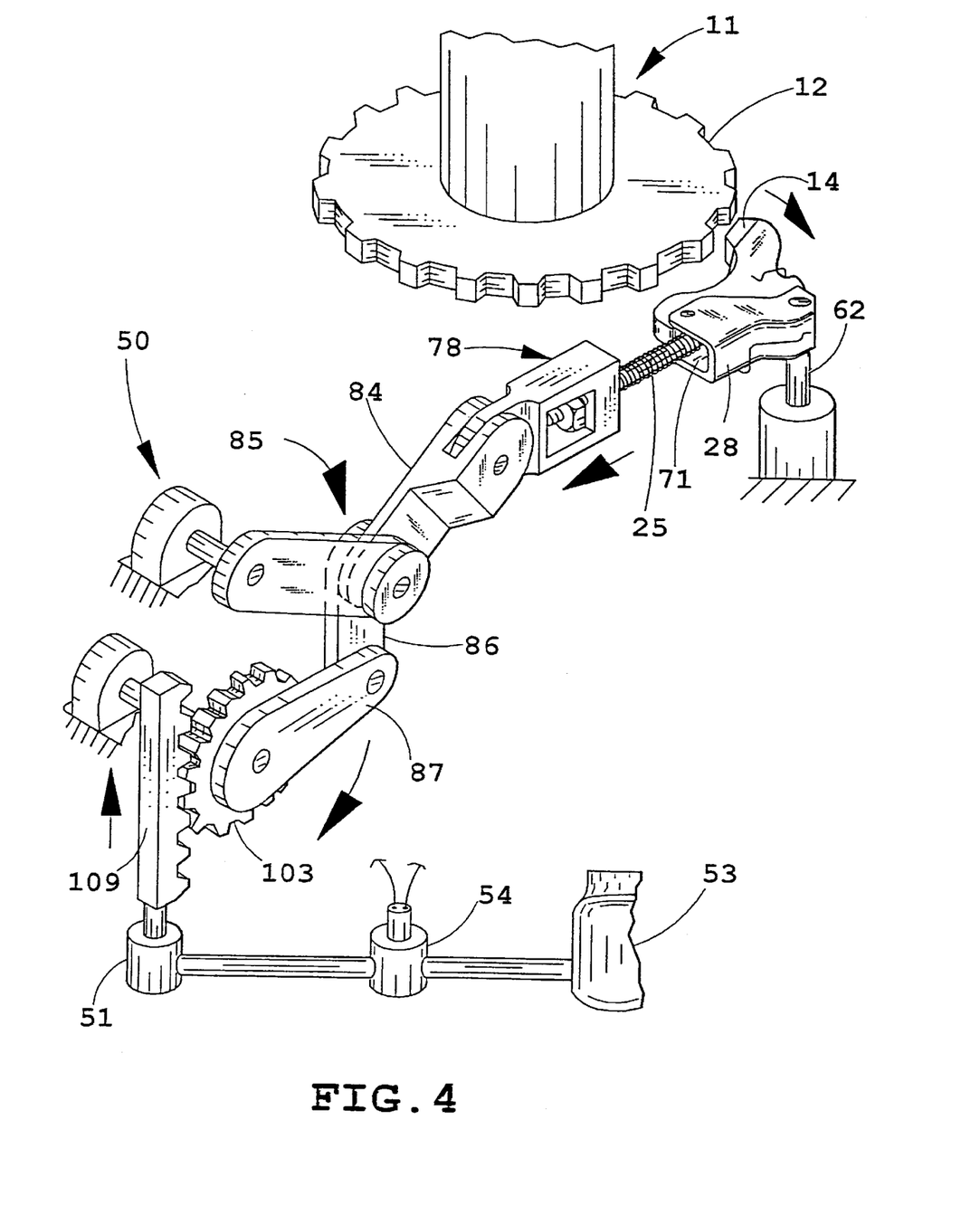
FIG. 4 is a view comparable to FIG. 3, but showing the park/lock mechanism in a released position (i.e., not in the park position)

As extendable rod 108 of actuator 51 is extended, it moves rack 109 which operably engages pinion gear 103 to rotate axle shaft 101. This causes link 87 to pull link 86. In turn, links 84 and 85 move from an aligned position (slightly overcenter) wherein the pivoting member 13 is engaged with notched drum 11 (FIGS. 2 and 3), to a retracted position wherein the pivoting member 13 is disengaged with notched drum 11 so that the transmission can be operated (FIG. 4).

The operating volume within cylinder 106 is connected to the operating fluid pressure of transmission 53 by hydraulic line 112 (FIG. 3). Notably, the cylinder 106 can be integrated into and integrally formed as part of the transmission casing, as well as line 112 can also be integrated into the casing. A solenoid operated valve including an electrically operated solenoid 54 is operably connected to line 112. Solenoid 54 of the valve is connected to the vehicle electrical system 55. The vehicle electrical system includes controller 56, brake operated switch 57, and ignition key-on switch 58. The vehicle electrical system 55 including controller 56 is configured to actuate solenoid 54 to open the valve only when the brake switch 57 and the ignition key-on switch 58 are in the predetermined vehicle operated conditions and when the shifter moves out of the park position. Other configurations are also contemplated to be within the scope of the present invention, such as where the actuator 51 or valve 54 is electrical, hydraulic, pneumatic, mechanical or combinations thereof.

The present apparatus 50 is particularly adapted to cooperate with a shifter 120 having electronics thereon. In particular, shifter 120 includes a sensor switch 121 for sensing the position of the pawl 122 when an operator presses a thumb button 123 for moving the shift lever 124 out of a park position. Shifters having pawls are well-known in the art such that a description need not be included herein for a skilled artisan to understand the present invention. Shifter 120 also includes a rotational potentiometer 125 for sensing the rotational position of the shift lever 124. The position of one or both of pawl 122 and shift lever 124 can be sensed through sensor 121 and potentiometer 125 to allow the engine/transmission control device 56 to control the transmission 10. Reference is hereby made to the low-profile shifter disclosed in pending co-assigned application Ser. No. 08/681766, filed Jul. 29, 1996, entitled VEHICLE SHIFTER and application Ser. No. 08/962437, filed Oct. 31, 1997, entitled VEHICLE SHIFTER RESPONSIVE TO SHIFTING BEHAVIORS, the entire contents of both are incorporated herein by reference, which are exemplary shifters that the present inventive system can be used with.

Extendable rod 108 (FIG. 3) of actuator 51 is spring biased to a normally retracted position by spring 126, so that if electrical power or voltage is lost, the rod 108 retracts to cause the linkage 52 to naturally lock and move the pivoting member 13 to a parked/locked position against notched drum 11. A manual override 129 includes a cable 130 and handle 131 that can be pulled to bias crank lever 131' to in turn manually cause the park/lock mechanism 50 to release. Specifically, the crank lever 131' rotates causing the linkage 52 to break open and the pivoting member 13 to disengage from notched drum 11. It is contemplated that this handle 131 would be located in a safe area, such as under a vehicle hood, and would only be used by repairmen or an owner/operator in case of emergency. Also, it is contemplated that this mechanical override can be keyed or restricted in some other manner so as to be used only by the vehicle owner.

Figure 3A:
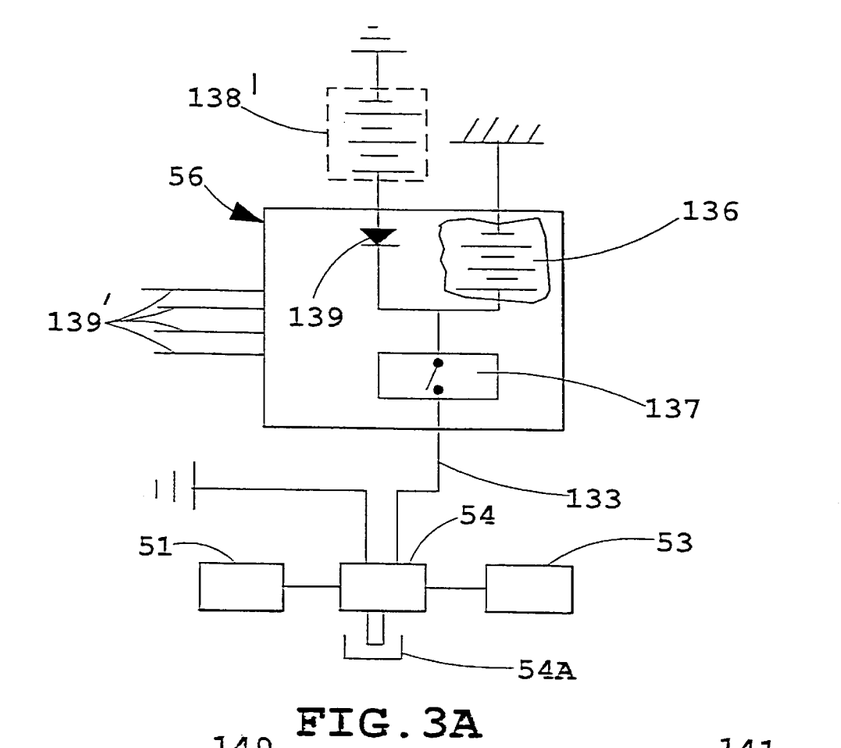
FIG. 3A is a schematic showing the electrical circuit connected to the solenoid valve for controlling the park/lock mechanism actuator.

An electrical override 132 (FIG. 3A) is electrically connected to control valve 54, and includes conductors 133 forming a circuit with a vehicle battery 138, an auxiliary battery 136, and a logic switch 137 inside of controller 56. The switch 137 is actuated by PROM, chip, or other logic circuit within controller 56 once predetermined vehicle conditions are met. Information on the predetermined vehicle conditions is input to the controller 56 via input lines 139. For example, lines 139 are connected to switches for sensing that the brake pedal is depressed, the ignition is on, and the like. Switch 137 is closed to energize solenoid valve 54 with power from the car battery 138, or if it is dead, then from auxiliary battery 136, so that solenoid valve 54 opens to dump fluid through line 112. This prevents hydraulic fluid from being trapped in cylinder 51, which would prevent spring 126 from causing extendable rod 108 from retracting to its normally locked park position. It is noted that battery 136 can be integrated into the vehicle casing of vehicle battery 138, or can be a secondary battery separate from the vehicle battery 138. A diode 139 or other circuit means can be used to control current flow from battery 136 and to control operation of electrical override 132. Specifically, the diode 139 is used to prevent battery 136 from also going dead if the vehicle electrical system (including vehicle battery 138) goes dead. It is contemplated that sensors can be added as desired to show or sense such things as the position of the linkage 52, the position of pivoting member 13, the position of the actuator 51, or the charge in battery 136.

Figure 3B:
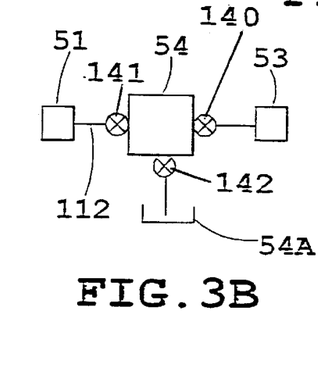
FIGS. 3B–3D are schematics showing the hydraulic circuit of the solenoid valve illustrated in FIGS. 3 and 3A.
Figure 3C:
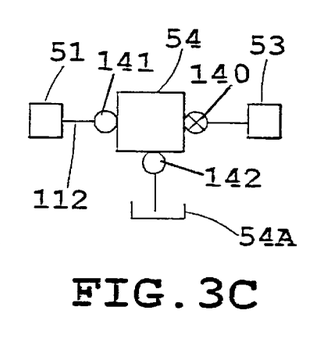
Figure 3D:
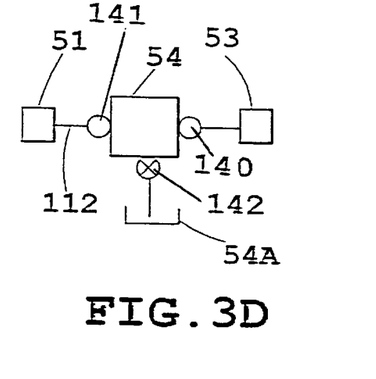

The operation of solenoid valve 54 is shown in FIGS. 3B–3D. Solenoid valve 54 is a three position valve, as shown in FIGS. 3B–3D, respectively. When there is no electrical power in the vehicle electrical system including to the valve 54 (FIG. 3B), the hydraulic pressure input port 140 is closed, the hydraulic output port 141 (connected to actuator 51) is closed, and the hydraulic dump port 142 (connected to sump 54A) is closed. When the vehicle power is on (FIG. 3C) but the shifter is still in park, the input port 140 remains blocked, but output port 141 is connected to dump port 142 so that hydraulic fluid dumps from actuator 51 to sump 143 in the transmission 53. Thus, the park/lock mechanism engages tooth 14 into a notch 12 to hold the vehicle in a stopped park position. When the conditions for shifting out of park are met and the controller 56 applies electrical power to the solenoid valve 54 (FIG. 3D), the input port 140 is connected to the output port 141 and the dump port 142 is blocked, allowing hydraulic pressure from the transmission 53 to flow to actuator 51 to extend rod 108. Notably, by this arrangement, hydraulic fluid is trapped in actuator 51 for a short time if all vehicle power is lost. Nonetheless, the battery 136 and/or the manual override 129 allow the system to be operated as needed for repair.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An apparatus comprising:
    a vehicle transmission having gearing and an antirotation device engageable to stop the gearing from moving;
    an interlock member integrated into the vehicle transmission for engaging the antirotation device, the interlock member being movable between a park position engaging the antirotation device to hold the gearing against rotation and a release position allowing the gearing to rotate;
    an actuator mounted in or on the transmission;
    linkage operably connecting the actuator to the interlock member;
    an electrical device operably connected to the actuator to move the interlock member to the release position only when predetermined vehicle operating conditions are met; and
    a shifter having a shift lever and a pawl, and having a sensor for sensing movement of one of the shift lever and the pawl, the sensor being operably connected to the electrical device.

2. The apparatus as defined in claim 1 wherein the actuator is hydraulically operated.

3. The apparatus as defined in claim 2 wherein the actuator is operably connected to the vehicle transmission by a fluid line.

4. The apparatus as defined in claim 3 wherein the linkage includes a toggle-type linkage having at least two links interconnected in an overcenter relationship when the interlock member is in the park position.

5. The apparatus defined in claim 1 including an override device connected to one of the interlock member, the actuator, and the linkage for manually overriding the actuator to manually move the interlock member to the release position.

6. The apparatus defined in claim 5 wherein the override device includes a cable connected to the actuator.

7. The apparatus defined in claim 1 wherein the actuator is spring biased to naturally move the interlock member toward the park position.

8. The apparatus as defined in claim 1 wherein the linkage includes a toggle-type linkage having at least two links interconnected in an overcenter relationship when the interlock member is in the park position.

9. An apparatus comprising:
    a vehicle transmission having gearing and an antirotation device engageable to stop the gearing from moving;
    an interlock member integrated into the vehicle transmission for engaging the antirotation device, the interlock member being movable between a park position engaging the antirotation device to hold the gearing against rotation and a release position allowing the gearing to rotate;
    a hydraulically operated actuator mounted in or on the transmission, the actuator being operably connected to the vehicle transmission by a fluid line;
    linkage operably connecting the actuator to the interlock member, the linkage including a toggle-type linkage having at least two links interconnected in an overcenter relationship when the interlock member is in the park position;
    an electrical device operably connected to the actuator to move the interlock member to the release position only when predetermined vehicle operating conditions are met; and
    a shifter having a shift lever and a pawl, and having a sensor for sensing movement of one of the shift lever and the pawl, the sensor being operably connected to the electrical device.

10. An apparatus comprising:
    a vehicle transmission having gearing and an antirotation device engageable to stop the gearing from moving;
    an interlock member integrated into the vehicle transmission for engaging the antirotation device, the interlock member being movable between a park position engaging the antirotation device to hold the gearing against rotation and a release position allowing the gearing to rotate;

a hydraulically operated actuator mounted in or on the transmission, the actuator being operably connected to the vehicle transmission by a fluid line;

linkage operably connecting the actuator to the interlock member;

an electrical device operably connected to the actuator to move the interlock member to the release position only when predetermined vehicle operating conditions are met;

an electronically operated valve in the fluid line for controlling fluid flow through the fluid line; and an override device operably connected to the electrically operated valve and configured to release fluid trapped in the actuator back to the vehicle transmission.

11. An apparatus comprising:

a vehicle shifter having a shift lever movable between gear positions including a park position, a pawl for holding the shift lever in the park position, and a sensor for sensing movement of one of the shift lever and the pawl when an operator is ready to shift out of the park position;

a transmission including a park/lock mechanism in the transmission for holding the transmission in a non-rotatable inoperative condition when the shift lever is in the park position; and an actuator electrically connected to the sensor and physically connected to the park/lock mechanism for operating the park/lock mechanism to move the park/lock mechanism only when predetermined vehicle conditions are met.

12. The apparatus as defined in claim 11 wherein the actuator is hydraulically operated.

13. The apparatus as defined in claim 12 wherein the actuator is operably connected to the transmission by a fluid line.

14. The apparatus defined in claim 13 including an electronically operated valve in the fluid line for controlling fluid flow through the fluid line, and including an override device for operating the electrically operated valve to release fluid trapped in the actuator back to the vehicle transmission.

15. The apparatus defined in claim 11 wherein the park/lock mechanism includes a toggle-type linkage having at least two links interconnected in an overcenter relationship when the shift lever is in the park position.

16. The apparatus defined in claim 11 including an override device connected to one of the interlock member, the actuator, and the linkage for manually overriding the actuator to manually move the interlock member to the release position.

17. The apparatus defined in claim 16 wherein the override device includes a cable connected to the actuator.

18. The apparatus defined in claim 11 wherein the actuator is spring biased to move the interlock member toward the park position.

19. A method comprising steps of:

providing a vehicle transmission having gearing and an antirotation device engageable to stop the gearing from moving, an interlock member in the vehicle transmission configured to engage the antirotation device, the interlock member being movable between a park position engaging the antirotation device to hold the gearing against rotation and a release position allowing the gearing to rotate, an actuator on the transmission, and a linkage operably connecting the actuator to the interlock member;

providing a shifter having a shift lever and a pawl, and having a sensor for sensing movement of one of the shift lever and the pawl;

providing a device operably connected to the sensor and to the actuator, the actuator being configured to move the interlock member to the release position only when predetermined vehicle operating conditions are met; and remotely actuating the actuator by use of the sensor and the device to move the linkage between an overcenter locked position where the interlock member is in the park position for holding the gearing against rotation and moving the linkage to an unlocked position where the interlock member is moved to the release position allowing the gear to rotate.

20. The method defined in claim 19 wherein the step of actuating includes powering the actuator by hydraulic fluid and pressure from the vehicle transmission.

21. The method defined in claim 19 wherein the step of remotely actuating includes electrically controlling operation of the actuator.

22. An apparatus comprising:

a vehicle transmission having gearing and an anitrotation device engageable to stop the gearing from moving;

an interlock member integrated into the vehicle transmission for engaging the antirotation device, the interlock member being movable between a park position engaging the antirotation device to hold the gearing against rotation and a release position allowing the gearing to rotate;

an actuator mounted in or on the transmission;

linkage operably connecting the actuator to the interlock member, the interlock member including a toothed member configured to engage the antirotation device;

the linkage including a rod operably engaging the toothed member for moving the toothed member between the park position and the release position, a slide configured to bias the rod toward the park position, a slide-engaging link pivoted to the slide, an anchored link pivoted to the slide-engaging link at a main toggle pivot, a driving link pivoted to the slide-engaging link and the anchored link at the main toggle pivot, and an actuator-connected link pivoted to the driving link and constructed to move the main toggle pivot overcenter relative to the anchored link and the slide-engaging link when in the park position; and an electrical device operably connected to the actuator to move the interlock member to the release position only when predetermined vehicle operating conditions are met.

\* \* \* \* \*